(Model.)

J. G. SCHÖNTHALER.
HORSESHOE HOLDER.

No. 371,634. Patented Oct. 18, 1887.

Witnesses:
F. Barrett
Fredk. W. Rubien

Inventor:
Johann G. Schönthaler

PER: Singer & Ebner
Attorneys.

UNITED STATES PATENT OFFICE.

JOHANN GOTTFRIED SCHÖNTHALER, OF TRENTON, NEW JERSEY.

HORSESHOE-HOLDER.

SPECIFICATION forming part of Letters Patent No. 371,634, dated October 18, 1887.

Application filed April 5, 1887. Serial No. 233,739. (Model.)

*To all whom it may concern:*

Be it known that I, JOHANN GOTTFRIED SCHÖNTHALER, a citizen of the United States, residing at the city of Trenton, county of Mercer, State of New Jersey, have invented a new and useful Improvement in Horseshoe-Holders, of which the following is a clear and exact description, reference being had to the accompanying drawings, of which—

Figure 1:
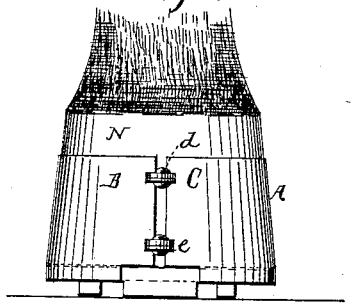
Figure 2:
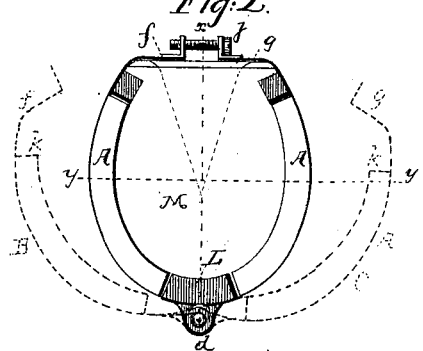
Figure 3:
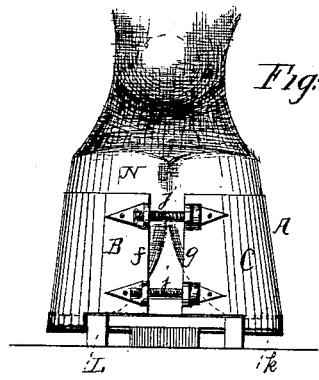
Figure 4:
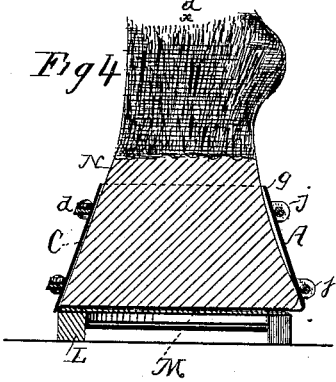
Figure 5:
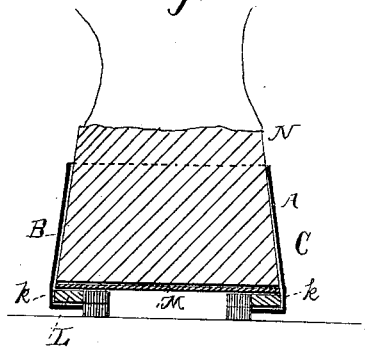

Figure 1 is a front view of my invention. Fig. 2 is a plan or bottom view. Fig. 3 is a back view. Fig. 4 is a sectional view on line $x\,x$, Fig. 2. Fig. 5 is a sectional view on line $y\,y$, Fig. 2.

The letter A represents the holder, made of metal and in two halves, B C, which are held together at $d\,e$ by hinges. The free rear ends, $f\,g$, are connected by screw-bolts $j\,j$, as shown in Fig. 3. The bottom of the holder is provided with a receptacle, $k$, formed by bending the metal of the holder at right angles. (See Figs. 2, 4, and 5.)

L is the horseshoe.

To use my invention first place the india-rubber protector M on the bottom of the hoof N. Then lay the shoe L against this rubber protector. Then place over or against the shoe L the protector A, as shown in Figs. 1, 2, 4, and 5. The ends $f\,g$ are then drawn together by the screw-bolts $j\,j$, which tightly clasp the two halves of the holder A firmly around the hoof, preventing it (the holder) from accidentally displacing itself. By this arrangement the horseshoe is securely held on the hoof without the aid of nails, which is desirable in many cases where the hoof will not permit the insertion of nails, and also for racing-horses, where the shoe is required to be taken off immediately after racing.

The rubber protector is not absolutely necessary, but is only used when the center or middle of the hoof is tender and some device is required to protect it.

I am aware that nailless sectional flexible horseshoes, together with horseshoe-sockets of movable parts, also adjustable overshoes and elastic hoof-protectors, have been constructed heretofore. My aim, however, is to produce an easily and quickly manipulated holder of horseshoes, one especially adapted to the immediate taking off of the latter when required.

What I claim is—

The combination, with the hoof-protector and the loose shoe, of the two-part metallic shoe-holder hinged at the front, secured by screw-bolts at the rear, and having at the bottom an inward-projecting flange cut away for the passage of the shoe-calks, substantially as described.

In witness whereof I hereunto set my hand in presence of two witnesses.

JOHANN GOTTFRIED SCHÖNTHALER.

Witnesses:
 ISRAEL HOWELL,
 JESSE E. BODINE.